United States Patent
Hampel

[15] 3,678,292

[45] July 18, 1972

[54] MULTI-FUNCTION LOGIC GATE CIRCUITS

[72] Inventor: Daniel Hampel, Westfield, N.J.

[73] Assignee: RCA Corporation

[22] Filed: Aug. 6, 1970

[21] Appl. No.: 61,678

[52] U.S. Cl. ....................307/207, 307/211, 307/215, 307/218, 307/235

[51] Int. Cl. ....................H03k 19/08

[58] Field of Search ....................307/207, 211, 215, 218, 235

[56] References Cited

UNITED STATES PATENTS 3,016,466 1/1962 Richards ....................307/207

3,406,296 10/1968 Huttenhoff et al. ....................307/207 X 3,539,824 11/1970 Yu et al. ....................307/207 X

*Primary Examiner*—John Zazworsky

*Attorney*—H. Christoffersen

[57] ABSTRACT

A pair of load impedances, and a plurality of signal controlled means, each such means supplying a current to one or the other of the load impedances depending upon the binary value represented by the signal controlling that means. By judicious choice of the respective values of the load impedances, the respective voltages developed across them is made to represent different logic functions, which may be completely unrelated to one another, of the input signals. The signal controlling a means may be an external signal or may be a feedback signal produced internally of the circuit.

16 Claims, 4 Drawing Figures

INVENTOR.
Daniel Hampel
BY
Henry Schwarzer
ATTORNEY

INVENTOR.
Daniel Hampel
BY
Henry Schanzer
ATTORNEY

MULTI-FUNCTION LOGIC GATE CIRCUITS

STATEMENT

The invention described herein was made in the performance of work under a NASA contract and is subject to the provisions of Section 305 of the National Aeronautics and Space Act of 1958, Public Law 85-568 (72 Stat. 435; 42 U.S.C. 2457).

SUMMARY OF THE INVENTION

A logic gate having two load impedances and a plurality of signal controlled means, each receptive of a signal representing a binary digit, and each supplying a current either to one or the other of said load impedances depending upon the value of the binary digit its signal represents. One of said impedances has a resistance $$R_1=\frac{K}{N-(T_1-C_1)}$$

and the other has a resistance $$R_2=\frac{K}{N-(T_2-C_1)}$$

where: K is a constant expressed in ohms, $T_1$ and $T_2$ are integers which are not equal to one another and which are in the range 1 to N, and $C_1$ is a constant approximately equal to one-half. The signal controlling a means may be an external signal or may be a feedback signal produced internally of the circuit.

TABLE 1

| A | B | C | D | Logic Functions at Outputs I and F | | | | | | | |
|---|---|---|---|---|---|---|---|---|---|---|---|
| Number of hi inputs | Number of lo inputs | Units of current thru $R_I$ | Units of current thru $R_F$ | T=1 | | | $T=\frac{N+1}{2}$ | | | T=N | |
| | | | | $V_I$ | $V_F$ | . . . . . | $V_I$ | $V_F$ | | $V_I$ | $V_F$ |
| n | 0 | 0 | n | hi | lo | | hi | lo | | hi | lo |
| n−1 | 1 | 1 | n−1 | ↓ | hi | | ↓ | ↓ | | lo | ↓ |
| n−2 | 2 | 2 | n−2 | ↓ | ↓ | | ↓ | ↓ | | ↓ | ↓ |
| . | . | . | . | ↓ | ↓ | | ↓ | ↓ | | ↓ | ↓ |
| $\frac{n+1}{2}$ | $\frac{n-1}{2}$ | $\frac{n-1}{2}$ | $\frac{n+1}{2}$ | ↓ | ↓ | | hi | lo | . . . . | ↓ | ↓ |
| $\frac{n-1}{2}$ | $\frac{n+1}{2}$ | . | . | ↓ | ↓ | | lo | hi | | ↓ | ↓ |
| . | . | . | . | ↓ | ↓ | | ↓ | ↓ | | ↓ | ↓ |
| 2 | n−2 | n−2 | 2 | ↓ | ↓ | | ↓ | ↓ | | ↓ | ↓ |
| 1 | n−1 | n−1 | 1 | hi | ↓ | | ↓ | ↓ | | ↓ | lo |
| 0 | n | n | 0 | lo | ↓ | | ↓ | ↓ | | ↓ | hi |
| REALIZED FUNCTIONS | | | | OR | NAND | . . . . | MAJ | $\overline{\text{MAJ}}$ | . . . . | AND | NOR |

NOTE.—For positive logic: hi=logic "1"; lo=logic "0". T=Threshold for output to go high.

BACKGROUND OF THE INVENTION

The invention relates to logic circuits and in particular to those circuits using mode switches which can switch a load current to one of two lines depending on the value of the input signal. Known threshold logic gates of this type have either a single output for producing a single function or two outputs for producing a first function and the complement of the dual of said first function.

This is best understood by referring to Table 1 which sets forth possible functions which may be realized using an N input threshold gate. Note that for the columns labeled T=1, T=(N+12 and T=N there are two sub-columns labeled $V_I$ and $V_F$. Sub-column $V_I$ represents the function at the I output (junction point 28 of FIG. 1) and sub-column $V_F$ represents the function at the F output (junction point 30 of FIG. 1). Where the summing resistors for each different threshold (T) condition are substantially equal ($R_I$ is equal to $R_F$) the function at the F output is the complement of the dual of the function produced at the I output. The AND function is the dual of the OR function; the NAND function is the dual of the NOR function. The NAND, $\overline{\text{MAJORITY}}$ and the NOR functions are, respectively, the complement of the dual of the OR, MAJORITY and AND functions. Note that for the case of MAJORITY and $\overline{\text{MAJORITY}}$, the complement of the dual is also the complement of the function.

A threshold gate operated as a MAJORITY gate provides an output and its complement, similarly to known emitter-coupled logic (ECL) circuits which provide either an output and its complement or a single output. When more than one function of the input signals is to be obtained, and the desired functions are other than those described above, two or more logic gates, each performing a different function, are necessary.

It is an object of the invention to provide a logic gate having two or more outputs for producing a multiplicity of different logic functions of the same input signals.

It is another object of the invention to provide an N input logic gate having two outputs for concurrently producing a first function at one output and a desired one of a large number of other functions at the other output.

DETAILED DESCRIPTION

Figure 1:
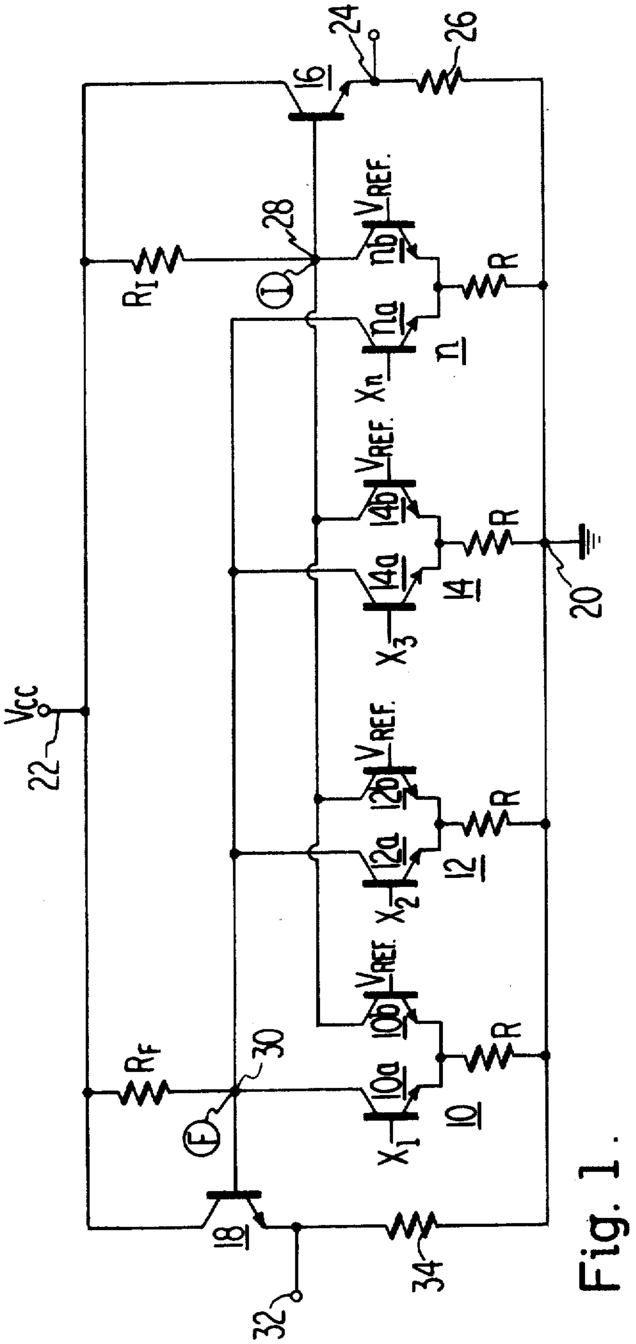
FIG. 1 is a schematic diagram of a threshold gate embodying one aspect of the invention.

The *n* input threshold gate of FIG. 1 includes *n* pairs of transistors, four pairs 10, 12, 14 and *n* of which are illustrated. Each transistor pair, such as 10, includes an *a* transistor and a *b* transistor connected at their emitters through an emitter resistor R to a point of reference potential 20, which may be ground. The first transistor, such as 10*a*, of each pair receives an input signal such as X1 at its base and the second transistor, such as 10*b*, of each pair receives a reference signal $V_{REF}$ at its base. In the example illustrated which employs npn transistors, the reference signal is a positive, with respect to ground, direct current level.

The collectors of the *a* transistors are connected via a common conductor to junction point 30 and the latter is connected through a common load resistor $R_F$ to the terminal 22 to which an operating voltage $V_{CC}$ is applied. The collectors of the *b* transistors are connected through a common conductor to the junction point 28 and from the latter through common load resistor $R_I$ to terminal 22. Emitter follower transistor 18 is connected at its base to junction point 30 and at its emitter to output terminal 32; emitter follower transistor 16 is connected at its base to junction point 28 and at its emitter to output terminal 24. Both of these transistors are connected at their collectors directly to terminal 22.

An important structural feature of the circuit of FIG. 1 is that the load resistors $R_F$ and $R_I$ are not of the same value. The significance of this structure will become clearer from the detailed discussion which follows of the operation of the circuit.

For ease of description in this specification, a signal at either of the junction points 28 and 30 which causes a low potential (less than $V_{REF}$) at its associated output terminal is called a "low" or logic "0" signal and a signal at either of these junction points which causes a high potential (more than $V_{REF}$) at its associated terminal is called a "high" or logic "1" signal.

In the operation of the FIG. 1 circuit, each pair of transistors is a means for supplying a given amount of current to one of $R_F$ and $R_I$. Each pair of transistors can be considered a switch means or a comparator and the current it supplies passes through its *a* side when the amplitude of its input signal is greater than (more positive than) the reference potential $V_{REF}$ and passes through its *b* side when the reverse is the case. Taking comparator 10, as an example, if the amplitude of signal $X_1$ ($V_{X1}$) is greater than the amplitude of $V_{REF}$ ($V_{X1} > V_{REF}$), the comparator will draw current from terminal 22 through resistor $R_F$ and through the collector-to-emitter path of transistor 10*a* through resistor R into terminal 20. The current ($I_a$) level is equal to the difference of the potential applied to the base of transistor 10*a* minus the base-to-emitter voltage drop ($V_{BE}$) of transistor 10*a* divided by the ohmic value of emitter resistor R;

$$\left[I_a = \frac{V_{X1} - V_{BE}}{R}\right]$$

If the amplitude of the signal applied to the base of transistor 10*a* is less than the amplitude of $V_{REF}$ ($V_{REF} > V_{X1}$), the comparator will draw current from terminal 22 through resistor $R_I$, through the collector-to-emitter path of transistor 10*b* and through resistor R into terminal 20. The current level ($I_b$) is equal to the difference in the potential applied to the base of transistor 10*b* minus the base-to-emitter voltage drop of transistor 10*b* divided by the ohmic value of R;

$$\left[I_b = \frac{V_{REF} - V_{BE}}{R}\right]$$

$I_a$ is slightly greater than $I_b$ since $V_{X1}$ must be slightly greater than $V_{REF}$ for conduction to occur through the *a* side. This difference ($I_a > I_b$) would require $R_F$ to be slightly less than $R_I$ (even if they are to be nominally equal); otherwise the output $V_F$ would not be centered at the threshold level and saturation of the input side transistor would result The emitter followers 16 and 18 level shift the signals generated at junction point 28 and 30 by one $V_{BE}$ drop and provide drive capability by isolating the junction points from the load. Emitter resistors 26 and 34 provide a return path between the output terminals 24 and 32 and ground terminal 20.

The voltages at the output terminals (24, 32) are compared to a reference potential which could be any arbitrarily selected value. However, to make a plurality of gates compatible with each other, all outputs are compared to a well defined threshold level defined in this specification as $V_{REF}$. Therefore the outputs of a gate are compatible with the input requirements of successive gates to which they may be directly connected. A signal at the output terminals (24, 32) whose potential is greater than $V_{REF}$ is defined as logic "1" while a signal whose potential is less than $V_{REF}$ is defined as logic "0."

Note that for a potential $V_{REF}$ at output terminal 24 or 32 the corresponding potential at junction points 28 or 30 is $V_{REF}+V_{BE}$ which is defined (for ease of reference) as $V_{REF_1}$. Due to the imbalance in the *a* and *b* side currents and to prevent saturation, in prior art circuits, $R_F$ is either omitted (the collectors of the *a* side transistors are returned to terminal 22 or its equivalent) or else $R_F$ is made slightly less than $R_I$. But note that any difference between $R_I$ and $R_F$ is designed to produce an output voltage which is indicative of a given function at the *I* output and the complement of the dual of that function at the *F* output. In contrast thereto, the present invention teaches the use of summing resistors of different values and develops the relationship that must exist between $R_I$ and $R_F$ to produce output signals which represent many different logic functions.

For the sake of the explanation which follows, it may be assumed that the current flowing through the resistor R of a comparator is some constant value $I_1$ which either arrives from the *a* transistor (when it is conducting and the *b* transistor is cut off) or the *b* transistor (when the *b* transistor is conducting and the *a* transistor is cut off). This assumption is reasonably correct and if desired, may be made more correct by substituting a transistor constant current source for the resistor R. When transistor 10*a* conducts, the potential at junction point 30 ($V_F$) is decreased by an amount equal to the current $I_1$ multiplied by the ohmic value of resistor $R_F$; ($I_1 = R_F$). The D.C. condition at junction point 30 due to the conduction of a single comparator may then be expressed in mathematical terms as: $V_F = V_{cc} - I_1 \times R_F$. When transistor 10*b* conducts, the potential at junction point 28 ($V_I$) is decreased by an amount equal to the current $I_1$ multiplied by the ohmic value of $R_I$ ($I_1 \times R_I$). The D.C. condition at junction point 28 due to conduction of transistor 10*b* may then be expressed as: $V_I = V_{cc} - I_1R_I$.

The remaining comparators (12 through *n*) are similar to and operate in the same manner as comparator 10. Thus, each comparator conducts a current through its *a* side if the input signal applied to the *a* side is greater than $V_{REF}$ and conducts approximately the same current through its *b* side when $V_{REF}$ is greater than the input signal applied on the *a* side.

The currents flowing through the *a* side of the comparators are summed in the line connecting the *a* sides in common and produce a voltage drop across summing resistors $R_F$ and similarly the currents in the *b* side of the comparators are summed through $R_I$. The signal voltage across each summing resistor is equal to the ohmic value of the summing resistor multiplied by the number of units of current flowing through it.

The voltage level at the two outputs (I and F) may then be expressed mathematically as:

$$V_I = V_{cc} - mI_1R_I \qquad (1)$$

and $$V_F = V_{cc} - (n-m)\, I_1R_F \qquad (2)$$

where $m$ = the number of units of current flowing through $R_I$ and may be any integer between "0" and *n*.

The voltage present at a junction point such as *F* is a function of the product of the number of units of current passing through the summing resistor ($R_F$ in this case) multiplied by the value of the summing resistor. The value of this voltage determines whether the signal at an output terminal such as 32 represents a 1 or a 0. An important feature of the present invention is the realization that this voltage value which, in effect, defines the logic function performed by the circuit can be controlled by choice of appropriate values of the summing resistors.

Before proceeding further, it is necessary to define the threshold (T) of a logic gate and make reference to Table 1 to understand the full range of possibilities available with the circuit of FIG. 1. The threshold (T) of the gate, as compared to the threshold level, is defined as the number of inputs of a particular value necessary to obtain a logic "1" at a particular output of the gate. The threshold (T) for the I side ($T_I$) is defined as the number of high inputs to cause the I output to go high and the threshold (T) for the F side ($T_F$) is defined as the number of low inputs to cause the F output to go high.

(Note that for the above definition of the threshold, $R_I = R_F$ when $T_I = T_F$.) The threshold (T) is related to the threshold level in that it states the number of input signals necessary to obtain an output voltage which when compared to the threshold level ($V_{REF}$) just exceeds it. For example, the threshold ($T_I$) determines the number of input signals that must be high to have a high output. Hence, the threshold determines the number of units of current through the summing resistors. This in turn determines the value of the summing resistors since the product of the summing resistor and the number of units of current for a given T must produce a high output.

Table 1 sets forth the possible functions which may be realized using an N input threshold gate. Column A lists in descending order from $n$ to "0" the possible number of high inputs while column B lists in ascending order the corresponding number of low input signals. Columns C and D respectively list the units of current flowing through $R_I$ and $R_F$ corresponding to the input signals listed in columns A and B. Columns 1 through N show the functions that may be realized for each threshold condition from 1 to N. For example, the function ($V_I$) realized when the threshold ($T_I$) is one (T=1) is the OR function since this condition provides a logic "1" output whenever one or more of the signal inputs is high. The function ($V_F$) realized for $T_F$=1 is the NAND function since this condition provides a low output only when all the inputs are high (zero inputs low). Similarly, the column $V_I$ for T=N represents the AND function since all input signals must be high in order to have a high output, while the $V_F$ column represents the NOR function since this condition provides a low output when 1 or more of the inputs is high. The remaining columns between T=1 and T=$N$ represent the (N−2) other function which may be obtained with the gate.

Whereas, the prior art taught, for example, the production of one function (i.e., OR) at one output (I) and the complement of the dual of that function (NAND) at the other output (F) ($R_I$ was substantially equal to $R_F$) the present invention teaches that for a given $R_I$ at the I output $R_F$ may be made any one of ($N$−1) other values to produce ($N$−1) other functions at the F output.

Having defined the threshold (T) of the gate and having defined the information contained in Table 1, there remains the problem of determining the value of the summing resistors for any desired function. The following analysis develops an equation for $R_I$ and $R_F$ in terms of the threshold of the gate.

Note first that, for a given threshold T, to obtain a "1" high output at output I there must be at least $T_I$ high inputs causing ($N-T_I$ units of current through $R_I$. Equation 1 may then be rewritten with ($N-T_I$) units of current substituted for $m$.

$$V_I = V_{cc} - (N-T_I)I_1R_I \qquad (3)$$

For the condition of ($N-T_I$) units of current in Equation 3, $V_I$ is greater than $V_{REF_1}$($V_I > V_{REF_1}$). Therefore:

$$V_{REF_1} < V_{cc} - (N-T_I)I_1R_I. \qquad (4)$$

Equation 4 formulates (for a given output resistor) the minimum number of high inputs necessary to produce a high output. The maximum possible number of high inputs to produce a low output occurs for the condition of one high input less than $T_I$ is ($T_I$−1). The output voltage for ($T_I$−1) high inputs may be expressed as:

$$V_{REF_1} > V_{cc} - [N-(T_I-1)]I_1R_I. \qquad (5)$$

An examination of Equations 4 and 5 shows that a change of one unit of current from $[N-(T-1)I_1]$ to $(N-T)I_1$ causes the output voltage to change from one state (low) to another state (high). It is desirable (though not essential) for purposes of noise immunity that the voltage threshold level, (the voltage against which a signal is measured to determine whether it represents a 1 or a 0) be exactly midway between the voltages obtained at these two current levels, that is:

$$V_{REF_1} = V_{cc} - [N-(T_I-\tfrac{1}{2})]I_1R_I. \qquad (6)$$

The value of $R_I$ may then be expressed as follows:

$$R_I = \frac{V_{cc}-V_{REF_1}}{I_1} \times \frac{1}{N-\left(T-\frac{1}{2}\right)} \qquad (7)$$

Note that $V_{cc}$ and $V_{REF}$ are constants and that the unit of current is also constant, therefore;

$$R_I = \frac{R_0 \text{ ohms}}{N-\left(T_I-\frac{1}{2}\right)} \qquad (8)$$

where: $R_0 = (V_{cc} - V_{REF_1})/I_1$ ohms.

An equation for $R_F$ similar to that for $R_I$ may be obtained from the following considerations. To get a high output ($V_F > V_{REF}$) at output F for a given threshold $T_F$ there must be a number of low inputs $T_F$ causing ($N-T_F$) units of current to flow through $R_F$. Equation 2 (above) may then be rewritten as follows:

$$V_{REF} < V_F = V_{cc} - (N-T_F)I_1R_F. \qquad (9)$$

If the number of low inputs is decreased by one ($T_F$−1), causing $[N-(T_F-1)]$ units of current to flow through $R_F$, the output $V_F$ becomes less than $V_{REF_1}$ $$V_{REF} > V_F = V_{cc} - [N-(T_F-1)]I_1R_F \qquad (10)$$

setting the threshold level midway between the two levels $$V_{REF} = V_{cc} - [N-(T_F-\tfrac{1}{2})]I_1R_F \qquad (11)$$

which solving for $R_F$ yields:

$$R_F = \frac{V_{cc}-V_{REF_1}}{I_1} \times \frac{1}{N-\left(T_F-\frac{1}{2}\right)} \qquad (12)$$

which may be expressed as:

$$R_F = R_0 \times \frac{1}{N-\left(T_F-\frac{1}{2}\right)} \text{ ohms} \qquad (13)$$

where $R_0$ as for Equation 8 is equal to:

$$R_0 = (V_{cc} - V_{REF_1})/I_1 \text{ ohms.}$$

An examination of Equations 8 and 13 shows that the summing resistors $R_I$ and $R_F$ may be expressed as a function of a constant term $R_0$ and a variable term $$\left[\frac{1}{N-\left(T-\frac{1}{2}\right)}\right]$$

The constant $R_0$ is directly proportional to the magnitude of the operating potential, the selected value for the reference potential and a constant $V_{BE}$ term ($V_{REF_1} = V_{REF} + V_{BE}$) and is inversely proportional to the chosen unit of current. The variable term defines a unique value of the summing resistor for each threshold from 1 to N and this unique value of the summing resistor in turn defines a unique logic function the circuit will perform (the function represented by the signal present at terminal 32).

The (½) term in Equation 13 is the preferred constant since it corresponds to the midpoint between the output signal representing a 1 which is closest in value to $V_{REF}$ and the output representing a 0 which is closest in value to $V_{REF}$. However, it should be appreciated that this term may be replaced by any constant ($C$) so long as the constant is greater than "0" and less than 1 ($0<C<1$). The limits on the constant ($0<C<1$) ensure (since T is an integer and varies in unit steps) that there is no overlap between adjacent functions.

For $R_F$ equal to $R_I$, as taught in the prior art, a given function is generated across $R_I$ and the complement of its dual across $R_F$. According to the invention, a given function may be obtained at the I output by determining a value of $R_I$ from Equation 7 for a given T ($T_1$). By selecting another T ($T_2$), other than $T_1$, and inserting said value for $T_F$ in Equation 13, ($N$−1) other values of summing resistor (each different $R_F$ corresponds to a different function) may be obtained. Using these different values of summing resistor, ($N$−1) logic functions may be generated at the F output which are other than the complement of the dual of the function generated at the I output.

The benefit of this teaching is evident since the logic gate may now be operated as if the two outputs were part of two completely different logic gates. The multifunctional capability of the novel gate may be appreciated from the following example. Assume that the OR function is to be performed at output I and the $\overline{\text{MAJ}}$ function is to be at output F. By knowing from a truth table such as Table 1 that for the OR function T=1 and that for the $\overline{\text{MAJ}}$ function $T=(N+1)/2$, $R_I$ may be found to be equal to $R_0/(2N-1)$ ohms and $R_F$ may be found to be $2R_0/N$ ohms.

Alternatively, it should be appreciated that the value of one summing resistor (i.e., $R_F$) may be deduced from the equation for the other summing resistor (i.e., $R_I$). There is a different $R_I$ for each threshold condition and corresponding to each $R_I$ there is an $R_F$ for which the F output is the complement of the dual of the I output. Now, assume for example that as above the I output is set to provide the OR function and that it is desired to perform the $\overline{\text{MAJ}}$ function at output F. It is known that the $\overline{\text{MAJ}}$ function is the complement of the dual of the MAJ function. $R_I$ for the MAJ function may be obtained from Equation 7 by substituting $T=(N+1)/2$ into the equation. Making $R_F$ equal to the value of $R_I$ which generates the MAJORITY function determines the value of the summing resistor ($R_F$) for the $\overline{\text{MAJ}}$ function. It should be obvious that this method may be extended so that the value of summing resistor at the F output may be calculated for each of the $N-1$ logic functions, other than the complement of the dual, which are possible with N inputs.

Figure 2:
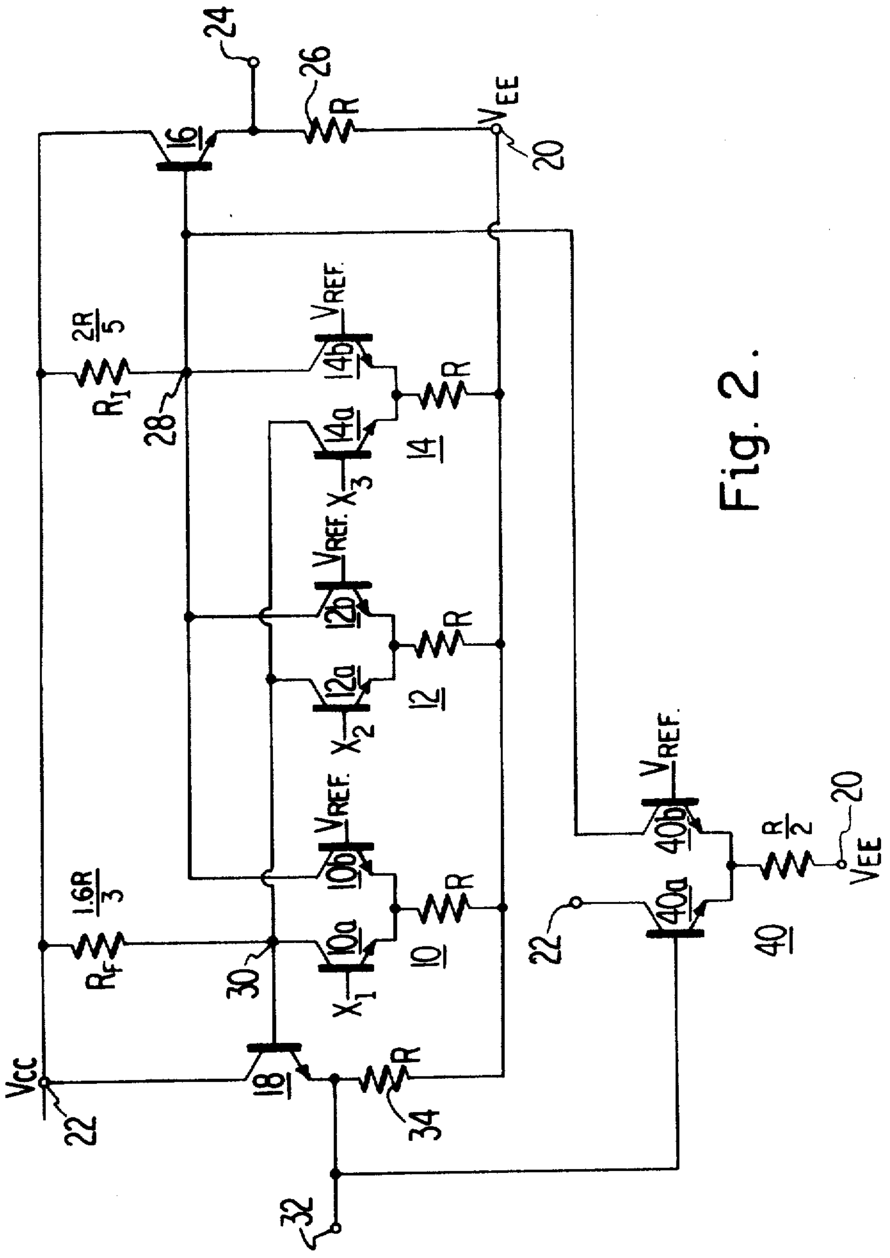
FIG. 2 is a schematic diagram of another threshold gate embodying the invention.

The circuit of FIG. 2 includes a first section comprising three current switches (10, 12, 14) and a second section comprising a current switch, 40. Current switch 40 is comprised of two transistors (40*a* and 40*b*) and has its signal input terminal (the base of transistor 40*a*) coupled to one circuit output terminal 32, and its output (collector of transistor 40*b*) connected to junction point 28. The base of transistor 40*b* is connected to the point of reference potential $V_{REF}$ and the collector of transistor 40*a* is connected to terminal 22. The emitters of transistors 40*a* and 40*b* are connected in common to one end of resistor 42, the other end of resistor 42 being connected to terminal 20.

Transistors 10*b*, 12*b*, 14*b*, and 40*b* draw their collector current through resistor $R_I$ while transistors 10*a*, 12*a* and 14*a* draw their collector current through resistor $R_F$.

The emitter resistors of comparators 10, 12, and 14 are set equal to each other and equal to some given value denoted by R. Having the same value of emitter resistance, comparators 10, 12, and 14 carry substantially the same collector current which for ease of reference will be defined as a unit of current. Thus, when all three input signals $X_1$, $X_2$, and $X_3$ represent binary 0, transistors 10*a*, 12*a*, and 14*a* are cut off and transistors 10*b*, 12*b*, and 14*b* together draw three units of current through resistor $R_I$.

The value of the emitter resistor of comparator 40 is R/2 ohms. Having an emitter resistor equal to one-half the value of the other emitter resistors means that, for the same input signal, comparator 40 conducts nominally twice as much collector current (two units of current) as the other comparators. Thus, when transistor 40*a* is cut off by a binary 0 signal applied to its base, transistor 40*a* draws two units of current through resistor $R_I$.

The logic gate generates two signals, one at junction point 28 and the other one at junction point 30. The signal generated at junction point 28 is shifted down by the $V_{BE}$ drop of transistor 16 to output terminal 24 ($V_{24} = V_{28} - V_{BE}$) and the signal generated at junction point 30 is shifted down by the $V_{BE}$ drop of transistor 18 to output terminal 32 ($V_{32} = V_{30} - V_{BE}$). The signal developed at terminal 32 is applied to the base of transistor 40*a*. If the signal is greater than $V_{REF}$, transistor 40*a* conducts and transistor 40*b* remains cut off and if the signal is less than $V_{REF}$, transistor 40*a* is cut off and transistor 40*b* conducts, drawing its two units of collector current through resistor $R_I$.

The value of resistor $R_I$ is chosen to be 2R/5. This value of resistor may be obtained by using Equation 7 above, with $T=(N+1)/2$ where $N = 5$. The output at junction point 28 is equivalent to that of a majority gate having five inputs since a logic "1" is produced when a majority of the inputs applied to current switches 10, 12, 14, and 40 are high (note the signal inputs to current switches 10, 12, and 14 have a weight of 1 while the input to current switch 40 has a weight of 2). When 0, 1, or 2 units of current flow through resistor $R_I$ the voltage $V_{28}$ at junction point 28 is greater than $V_{REF}$ and represents a "1." When 3, 4, or 5 units of current flow through resistor $R_I$, $V_{28}$ is less than $V_{REF}$ and represents a 0.

The value of resistor $R_F$ is chosen to be 1.6R/3. When 0 or 1 units of current flow through this resistor, $V_{30}$ is high representing a 1 and when 2 or 3 units of current flow through this resistor $V_{30}$ is low representing a 0. (The theoretical value of $R_F$ should be 2R/3, as determined from Equations 7 or 13 for $T=(N+1)/2$ where $n=3$. However, in order to offset the difference between $I_a$ and $I_b$ and to prevent transistors 10*a*, 12*a*, or 14*a* from saturating, $R_F$ is made slightly lower than its theoretical value.)

In the detailed analysis which follows, it will be shown that $V_{32}$ represents the minority (or $\overline{\text{majority}}$) function of the three input signals $X_1$, $X_2$ and $X_3$, whereas $V_{24}$ represents the odd parity function of these same input signals (it has the value 1 only where an odd number 1 or 3 of the three input signals represent 1's). Note that these functions are unrelated—one is neither the dual nor the complement, nor the complement of the dual of the other.

The operation of the circuit is summarized in Table 2 below.

TABLE 2

| Number of signal INPUTS Hi | Number of signal INPUTS Lo | Units of current thru $R_F$ | $V_{32}$ | Units of current thru $R_I$ from comparators 10, 12, 14 | 40 | Total | $V_{24}$ |
|---|---|---|---|---|---|---|---|
| 0 | 3 | 0 | Hi | 3 | 0 | 3 | Lo. |
| 1 | 2 | 1 | Hi | 2 | 0 | 2 | Hi. |
| 2 | 1 | 2 | Lo | 1 | 2 | 3 | Lo. |
| 3 | 0 | 3 | Lo | 0 | 2 | 2 | Hi. |

Following is an analysis of the circuit operation for the four different conditions noted in column 1 of Table 2.

1. No high input signals ($X_1=X_2=X_3=$"low"=logic "0")

With $X_1$, $X_2$, and $X_3$ low, transistors 10*a*, 12*a*, and 14*a* are nonconducting. Under this condition, very little current flows through resistor $R_F$ and the potential at junction point 30 ($V_{30}$) is high. The high of $V_{30}$ minus the $V_{BE}$ drop of transistor 18 is the voltage present at circuit output terminal 32 and applied to the base of transistor 40*a*. This potential $V_{32}$ is greater in amplitude than $V_{REF}$ (it represents a 1) rendering transistor 40*a* conducting and transistor 40*b* non-conducting or cut off. Thus, comparator 40 draws no current through resistor $R_I$ so that the total current flowing in this resistor receives the three units of current provided by 10*b*, 12*b*, and 14*b*. They, however, are sufficient to cause the potential at junction point 28 to go low. $V_{28}$ low minus the $V_{BE}$ drop of emitter follower 16 is coupled to output terminal 24, so that $V_{24}$ represents a 0.

2. One of the three input signals is high (It does not matter which one of the three input signals is high and which ones are low.) With one input high and two inputs low there will be one unit of current drawn through resistor $R_F$ by one of the three input current switches (10, 12, 14) and two units of current drawn through resistor $R_I$ by the two remaining input current switches. With only one unit of current flowing through resistor $R_F$, the potential at junction point 30 remains high. $R_F$ is selected so that two or more units of current have to flow through it before the output signal at junction point 30 goes low. The high of $V_{30}$ minus the $V_{BE}$ of transistor 18 is applied to the base of transistor 40*a*. Since the net signal applied to the base of transistor 40*a* is greater than $V_{REF}$, transistor 40*a* conducts and maintains transistor 40*b* non-conducting. Thus transistor 40*b* does not draw any current through resistor $R_I$ and only two units of current remain flowing through $R_I$.

Because $R_I$ is of value 2R/5, at least 3 units of current must flow through it to cause the voltage $V_{28}$ to be low. Therefore $V_{28}$ is high and the output signal $V_{24}$ is also high representing a 1.

3. Two of the three input signals are high

With two of the three input signals high, two of the three transistors 10*a*, 12*a*, 14*a* draw two units of current through resistor $R_F$ with the remaining comparator drawing one unit of current through resistor $R_I$. With two units of current flowing through resistor $R_F$ the majority decision level is exceeded and the potential at junction point 30 goes to the low state. The low value of $V_{30}$ minus the $V_{BE}$ drop appears as a low (binary 0) value of output voltage $V_{32}$ at the emitter of transistor 18. This voltage applied to the base of transistor 40*a* cuts it off and causes transistor 40*b* to conduct two units of current through resistor $R_I$. There are thus three units of current flowing through resistor $R_I$. With three units of current flowing through $R_I$ the potential at junction point 28 goes into the low state and the potential at output terminal 24 which is equal to $V_{28}$ minus the $V_{BE}$ of transistor 16 is low (represents a 0).

4. All three input signals are high

With $X_1$, $X_2$, and $X_3$ high, transistors 10*a*, 12*a*, and 14*a* conduct while transistors 10*b*, 12*b*, and 14*b* are rendered nonconductive. Three units of current are drawn through resistor $R_F$ causing $V_{30}$ to be low. $V_{30}$ minus the $V_{BE}$ drop of transistor 18 is applied to the base of transistor 40*a*, causing the output signal $V_{32}$ to be low representing a 0. Since this potential is less than $V_{REF}$ transistor 40*a* is cut off while transistor 40*b* conducts two units of current from terminal 22 through resistor $R_I$. With only two units of current flowing through resistor $R_I$, the potential at junction point 28 is high and this high minus the $V_{BE}$ drop of transistor 16 appears at output terminal 24. Thus, $V_{24}$ represents a 1.

As discussed above and as is evident from Table 2, the current through $R_I$ is either two units of current or three units of current. The output voltage at junction point 28 therefore varies very little about the threshold level. This limited change in output potential ensures that the switching transistors as well as the emitter-follower will not be saturated and furthermore eliminates the need for any clamping circuit to be connected either across $R_I$ or to junction point 28 to prevent saturation.

The circuit of FIG. 2, while illustrated as a three-input gate with internal feedback of weight 2, can be operated with the feedback loop open (the connection from 32 to 40 open) and with a fourth input $X_4$ of weight 2 at the base of transistor 40*a*. Operated in this way, the logic functions $F_{32}$ and $F_{24}$ performed by the circuit (the binary outputs available at terminals 32 and 24, respectively) can be shown to be:

$$F_{32} = \overline{MAJ}(X_1, X_2, X_3) \qquad (14)$$

$$F_{24} = X_4(X_1+X_2+X_3)+X_1X_2X_3 \qquad (15)$$

Again, these functions are unrelated.

It is also clear that by changing the value of one or both of $R_F$ and $R_I$, the logic functions performed by the circuit can be changed to that defined by many other equations.

While in the FIG. 1 and FIG. 2 circuits, each input signal $X_1$, $X_2$, and $X_3$ has the weight 1, it is to be understood that the invention is perfectly general in the sense that anyone or more of these signals can have any weight $\omega$, where $\omega$ may be 1, 2, 3,---$m$. The technique for doing this is illustrated in FIG. 2 with comparator 40 and requires only suitable choice of the value of the common emitter resistor—R/2 for weight 2, R/3 for weight 3, and so on. Similarly, in those circuits employing feedback, the feedback current can have the weight 2, as shown, or 1, 3, 4---$m$.

Figure 3B:
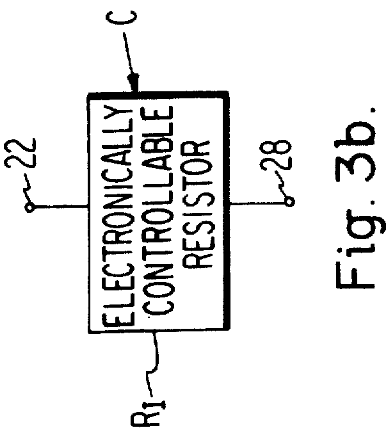
FIG. 3*b* is a block diagram of an electronically controlled resistor which may be used to practice the invention.
Figure 3A:
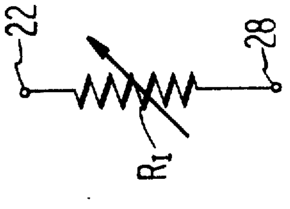
FIG. 3*a* is a drawing of a variable resistor which may be used to practice the invention.

While in the discussion up to this point the load impedances $R_F$ and $R_I$ are shown to be of fixed value, they may instead be of controllable value for permitting quick change of the logic function or functions performed by the circuit. FIG. 3*a* shows one way this may be done and is applicable both to $R_F$ and $R_I$. FIG. 3*b* illustrates an embodiment employing an electronically controllable resistor, where C is the control signal which may be an analog signal or one of a group of binary signals. The resistor may include one or more transistor switches and resistor elements switched into or out of the circuit in response to the control signal(s) or it may be implemented in other ways well known to those skilled in the art.

What is claimed is:

1. In combination:

two load impedances, one having a resistance $$R_1=\frac{K}{N-(T_1-C_1)}$$

and the other having a resistance $$R_2=\frac{K}{N-(T_2-C_1)}$$

where: $N$ is an integer greater than 1, $K$ is a constant expressed in ohms, $T_1$ and $T_2$ are integers which are not equal to one another and which are in the range 1 to $[(N-1)]$ $N$, and $C_1$ is a constant approximately equal to one-half; and a plurality of signal controlled means for supplying N units of current to said load impedances, each signal controlled means receptive of a signal representing a binary digit, and each supplying a current either to one or the other of said load impedances depending upon the value of the binary digit its signal represents.

2. The combination as set forth in claim 1 wherein each such signal controlled means supplies $w(1/m)$ units of said current, where $m$ is an integer and $w$ is an integer having some value 1,2---, $(m-j)$, where $j$ is an integer less than $m$, and where $w$ need not be the same for each signal controlled means.

3. The combination as set forth in claim 2 further including means responsive to the voltage developed across one of said impedance means for producing a control signal representing a binary digit, said signal serving as the signal for controlling one of said signal controlled means.

4. A threshold logic circuit comprising:

N current switches where N is an integer greater than 1, each current switch having a first input adapted to receive an input signal and a second input adapted to receive a reference signal, and first and second output lines for conducting a load current on said first output line when said input signal is of greater amplitude than said reference signal and for conducting approximately the same load current on said second output line when said input signal is of lower amplitude than said reference signal;

means coupling the first output line of each of said current switches in common to a first current carrying line, and means coupling the second output lines of each of said current switches in common to a second current carrying line;

first load means having a resistance equal to $$\frac{K}{N-\left(T_1-\frac{1}{2}\right)}$$

and a second load means having a resistance equal to $$\frac{K}{N-\left(T_2-\frac{1}{2}\right)}$$

where: $K$ is a constant expressed in ohms and $T_1$ and $T_2$ are integers in the range from 1 to $N$ with $T_1$ not equal to $T_2$; and means coupling said first load means to said first current carrying line, and means coupling said second load means to said second current carrying line.

5. The combination as claimed in claim 4 further including an additional current switch;

means coupling the first input of said additional current switch to one of said first and second current carrying lines;

means for coupling the second input of said additional current switch to said reference signal; and means coupling one of the first and second output lines of said additional current switch to the other one of said first and second current carrying lines.

6. The combination as claimed in claim 4 further including at least one additional current switch having first and second inputs and at least one output line;

means coupling said output line to one of said first and second current carrying lines for producing across its associated load impedance an output signal which is a function of the input signals applied to said N current switches and to said additional current switch.

7. A threshold logic gate comprising:

first and second current carrying lines;

N current switches, where N is an integer greater than one, each current switch having a first and a second input adapted to receive a binary and a reference signal, respectively, and first and second output lines for conducting current in one of said first and second outputs in response to the input signal being greater than said reference signal and being by definition of first binary significance or for conducting current in the other one of said first and second output lines in response to the input signal being less than said reference signal and being by definition of second binary significance;

means coupling the first output line of each current switch in common to said first current carrying line;

means coupling the second output line of each current switch in common to said second current carrying line;

first and second load impedance having a resistance value each equal to $$\frac{K}{N-(T_1-C_1)} \text{ and } \frac{K}{N-(T_2-C_1)}$$

respectively; where: $K$ is a constant expressed in ohms; $C_1$ is a constant greater than zero and less than 1;

$T_1$ is the minimum number of inputs of first binary significance for producing an output of first binary significance across said first impedance and $T_2$ is the minimum number of inputs of second binary significance for producing an output of first binary significance across said second impedance, $T_1$ and $T_2$ are integers in the range from 1 to $N$, and $T_1$ is not equal to $T_2$;

means coupling said first load means to said first current carrying lines for producing in response to $T_1$ inputs of first binary significance a flow of $(N-T_1)$ units of current through it for generating an output voltage whose amplitude is of first binary significance with respect to a given reference potential; and means coupling said second load means to said second current carrying line for producing an output voltage whose amplitude is of first binary significance with respect to said given reference potential when the number of inputs of second binary significance is greater than $T_2$.

8. The combination as claimed in claim 7 wherein $C_1$ is equal to one-half.

9. The combination as claimed in claim 7 wherein each current switch includes first and second transistors, each transistor having base, emitter and collector electrodes and a relatively constant current carrying path;

wherein the first transistor has its collector connected to said first current carrying line and its base connected to said first input and the second transistor has its collector connected to said second current carrying line and its base connected to said second input; and wherein their emitters are connected in common to said relatively constant current carrying path, wherein substantially all of said current flows through the collector of said second transistor when the input signal is less than said reference potential and wherein substantially all of said current flows through the collector of said first transistor when the input signal is greater than said reference potential.

10. The combination as claimed in claim 7 wherein the constant $K$ is proportional to the value of the operating potential minus the value of the reference potential and inversely proportional to the value of the current in said current carrying path.

11. A logic gate comprising:

first and second current carrying lines;

a plurality of current switches each having first and second inputs adapted to receive an input signal and a reference signal, respectively, and first and second output lines for conducting current in one of said output lines in response to the input signal being greater or less than said reference signal;

means coupling the first output line of each current switch in common to said first current carrying line;

means coupling the second output of each current switch in common to said second current carrying line;

first and second load impedances connected to said first and second current carrying lines respectively for summing the current flowing in each line and producing a potential across said impedance having a first significance if the potential across said impedance is greater than a given reference level and having a second significance if the potential is less than said given reference level; and an additional current switch having first and second inputs and at least one output said first input being coupled to one of said current carrying lines and its output being coupled to the other one of said current carrying lines.

12. The combination as claimed in claim 11 wherein said first load impedance and said second load impedance have substantially different values.

13. The combination as claimed in claim 11 wherein said first load impedance has a first value for producing thereacross a voltage indicative of the presence of the input signals applied to said plurality of current switches and wherein said second load impedance has a second value for producing thereacross a voltage indicative of the presence of the input signals applied to said plurality of current switches plus the input applied to said additional current switch.

14. The combination as claimed in claim 11:

wherein each of said current switches is comprised of first and second transistors each having a base, an emitter and a collector electrode;

wherein the base of said first transistor is connected to a signal input, wherein the base of said second transistor is connected to a reference potential, wherein the collector of said first transistor is connected to said first current carrying line and wherein the collector of said second transistor is connected to said second current carrying line; and wherein the emitter of said first and second transistor are connected in common to a relatively constant current carrying path.

15. The combination as claimed in claim 14:

wherein the plurality of current switches is equal to three and wherein the current carrying path of each current switch includes a resistor of value $R$; and wherein the current carrying path of the additional current switch includes a resistor having a value equal to one-half $R$ ($R/2$).

16. In combination with a logic gate having a first junction point at which a signal is developed which represents a first logic function of a plurality of input signals and a second junction point at which a signal is developed which represents a second logic function of said input signals, the improvement comprising:

a current switch having first and second input terminals and at least one output line, said first input terminal being adapted to receive an input signal and said second input terminal being adapted to receive a reference signal, said current switch providing a load current on said output line when the signal at said first input terminal is of greater amplitude than said reference signal;

means for coupling the first input terminal of said current switch to said first junction point of said logic gate; and means for coupling the output line of said current switch to the second junction point for causing said second logic function to be responsive in part to said first logic function.

* * * * *

UNITED STATES PATENT OFFICE
CERTIFICATE OF CORRECTION

Patent No. 3,678,292 Dated July 18, 1972

Inventor(s) Daniel Hampel

It is certified that error appears in the above-identified patent and that said Letters Patent are hereby corrected as shown below:

Table 1, Col. A - "n+1 / 2" should read -- $\frac{n+1}{2}$ --

"n-1 / 2" should read -- $\frac{n-1}{2}$ --

Table 1, Col. B - "n-1 / 2" should read -- $\frac{n-1}{2}$ --

"n+1 / 2" should read -- $\frac{n+1}{2}$ --

Table 1, Col. C - "n-1 / 2" should read -- $\frac{n-1}{2}$ --

Table 1, Col. D - "n+1 / 2" should read -- $\frac{n+1}{2}$ --

Col. 1, line 48 - "T=(N+12" should read -- $T=\frac{N+1}{2}$

Col. 1, line 48 - "T=N" should read -- T= "N" --

Col. 4, line 23 - "$(I_1 = R_F)$" should read -- $(I_1 \times R_F)$ --

Col. 5, line 48 - "$(N - T_I$" should read -- $(N - T_I)$ --

Col. 5, line 54 - "$V_{REF1}$ $(V_1 > V_{REF1})$" should read

-- $V_{REF_1}$ $(V_1 > V_{REF_1})$ --

FORM PO-1050 (10-69)
3530 6|72

USCOMM-DC 60376-P69
U.S. GOVERNMENT PRINTING OFFICE 1969 O—366-334

UNITED STATES PATENT OFFICE

CERTIFICATE OF CORRECTION

Patent No. 3,678,292 Dated July 18, 1972

Inventor(s) Daniel Hampel

It is certified that error appears in the above-identified patent and that said Letters Patent are hereby corrected as shown below:

Col. 6, line 4 - "$V_{REF}$" should read -- $V_{REF_1}$ --

Col. 6, line 12 - "$V_{REF}$" should read -- $V_{REF_1}$ --

Col. 6, line 17 - "$V_{REF}$" should read -- $V_{REF_1}$ --

Col. 6, line 23 - "$V_{REF}$" should read -- $V_{REF_1}$ --

Col. 6, line 47 - "($V_{REF1}$" should read -- ($V_{REF_1}$ --

Column 10, lines 19-20 - delete "[(N-1)]".

Signed and sealed this 20th day of November 1973.

(SEAL)
Attest:

EDWARD M.FLETCHER,JR.
Attesting Officer

RENE D. TEGTMEYER
Acting Commissioner of Patents

FORM PO-1050 (10-69)

USCOMM-DC 60376-P69
☆ U.S. GOVERNMENT PRINTING OFFICE : 1969 O—366-334